United States Patent
Kardashian

[15] 3,657,641
[45] Apr. 18, 1972

[54] ANISOTROPIC THIN FILM PLATED WIRE MAGNETOMETER UTILIZING A COIL OF PLATED WIRE HAVING A PLURALITY OF TURNS

[72] Inventor: Vahram S. Kardashian, Plymouth Village, Minn.

[73] Assignee: Honeywell Inc., Minneapolis, Minn.

[22] Filed: June 11, 1970

[21] Appl. No.: 45,466

[52] U.S. Cl. .................................. 324/43 R, 340/174 TF
[51] Int. Cl. ..................................................... G01r 33/02
[58] Field of Search .......................... 324/43; 340/174 TF

[56] References Cited

UNITED STATES PATENTS

| | | | |
|---|---|---|---|
| 3,239,754 | 3/1966 | Odom, Jr. et al. | 324/47 |
| 3,400,328 | 9/1968 | Penn et al. | 324/43 |
| 3,421,075 | 1/1969 | Belson | 324/43 |
| 3,562,638 | 2/1971 | Renard | 324/43 |

Primary Examiner—Rudolph V. Rolinec
Assistant Examiner—R. J. Corcoran
Attorney—Lamont B. Koontz and Omund R. Dahle

[57] ABSTRACT

A thin film plated wire magnetometer in which the plated wire configurations are arranged to provide a very sensitive and compact instrument. The device is sensitive to magnetic field variations in the order of a fraction of one gamma. A plated wire is wound a number of turns around a cylindrical or rectangular core, the plated wire acting as both sensor material and pickup coil. A high frequency energized driver coil is wound over the plated wire sensor coil, in one embodiment the driver coil is a toroidal winding.

6 Claims, 6 Drawing Figures

PATENTED APR 18 1972 3,657,641

INVENTOR.
VAHRAM S. KARDASHIAN
BY Omund R Dahle
ATTORNEY.

ANISOTROPIC THIN FILM PLATED WIRE MAGNETOMETER UTILIZING A COIL OF PLATED WIRE HAVING A PLURALITY OF TURNS

BACKGROUND AND SUMMARY OF THE INVENTION

In the field of thin film magnetometers there has been described in the prior art, such as U.S. Pat. No. 3,421,075, the utilization of conductors coated with thin films of ferromagnetic material. These thin films which are evaporated onto or electroplated onto metallic wire conductors are known as plated wire, and used for magnetometer sensors they exhibit a uniaxial anisotropy along the "easy" axis and can have ideally a single magnetic domain.

In the present invention there is disclosed and described novel configurations of the plated wire sensor which results in a very sensitive and compact magnetometer coupled together with low manufacturing costs.

DESCRIPTION

Figure 1:
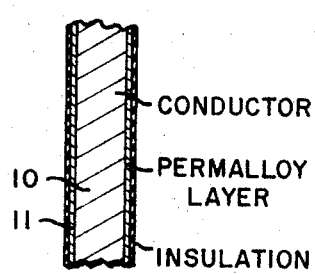
FIG. 1 is a cross-section illustration of a short length of the plated wire utilized in the magnetometer.

Referring now to FIG. 1 there is shown a section of plated wire, such as is known in the art, having in one specific instance a 5 mil diameter Beryllium-Copper substrate wire 10 which has been plated with an anisotropic magnetic permalloy film 11 of approximate composition of 80 percent Ni and 20 percent Fe. During deposition of the ferromagnetic film, a magnetic field is applied so that a preferred axis, called the easy axis, is obtained which is oriented circumferentially about the wire. I have also shown that helical easy axes can be used as well as longitudinal. The magnetization vector $\overline{M}$ may lie along this axis in the absence of external fields and make a closed loop of magnetic flux around the wire. The axis perpendicular to the easy axis is called the hard axis and its direction is along the wire. The exterior surface of the plated wire is coated with a layer of suitable insulation which will withstand the abrasion and flexing of the winding described below. The plating provides the medium which is disturbed by the ambient magnetic field as well as its disturbance and the wire substrate may act as its own pickup, that is, it develops an induced voltage.

Figure 2:
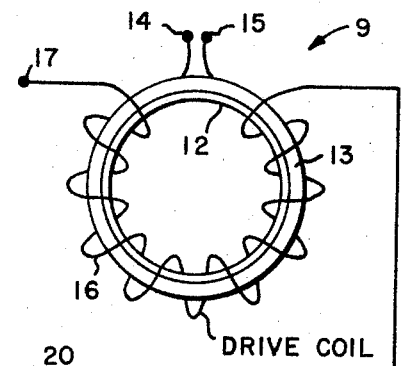
FIG. 2 is a diagrammatic representation of one configuration of the plated wire sensor.

Referring now to FIG. 2 there is disclosed a ring shaped embodiment of a sensing coil means or pickup coil 9 having a cylindrical form 12 around which is wound a plurality of turns 13 of the plated wire terminating at terminals 14 and 15. These turns 13 form the inner coil. The sensor also includes a toroidally wound outer coil 16 which is wound around the inner coil. It will be noted from the drawing that halfway around the ring, the direction of winding 16 reverses. The outer coil has terminals 17 and 20. Either the outer coil or the inner coil may be the drive coil and the other the pickup. The reverse winding in the outer coil permits the drive field direction in the two arms of the sensor to oppose each other. In one specific embodiment, 70 turns of plated wire were wound on form 12 for the inner coil and 600 turns of outer coil were wound around the inner coil. This sensor performs with a pulse driven current to be described later.

Figure 3:
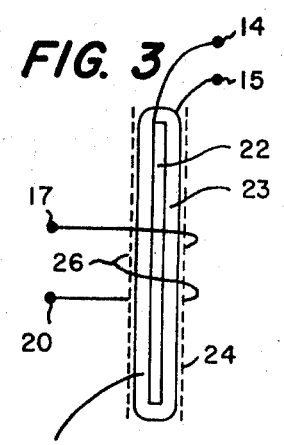
FIG. 3 is a diagrammatic representation of another configuration of the plated wire sensor.

FIG. 3 discloses a thin rectangular or flattened sensor embodiment of the sense coil or pickup coil having a form 22 around which is wound a plurality of turns 23 of the plated wire having terminals 14 and 15. In this embodiment the plated wire coil is enclosed by an electrostatic shield 24 in order to reduce capacitive coupling between the plated wire sense winding and the drive coil 26. The shield material may be copper clad Mylar etched at ruled intervals in a manner similar to a coarse grating. Two layers placed one over the other with the etched lines of the second overlying the copper lines of the first make up the shield. In one specific embodiment of FIG. 3 the plated wire coil 23 consists of 70 turns and the drive coil 26 of 300 turns wound around the shielding 24 in a direction perpendicular to that of the sense coil winding. The flattened sensor and the ring shaped are directional devices which sense that component of a signal field which is along its axis of maximum sensitivity.

Under the action of the earth's field, the magnetization vector M rotates until it reaches an equilibrium orientation between the moment of the magnetic field and the anisotropic field force. The current I from the generator to the drive coil produces a drive field $H_d$ and the drive field also rotates M to a new equilibrium position. A rotating M generates a signal in the plated wire to provide an output signal at terminals 14 and 15. If desired, the outer coil may be the output coil in place of the inner coil. During the operation of the device, the magnetic sensor which is subject to a drive field is under the influence of both an ambient magnetic field and a magnetic signal field. With a change in the equilibrium position there results a change in the induced voltage. It is this variation in voltage which is measured and is a measure of the change in the magnetic field.

Figure 4:
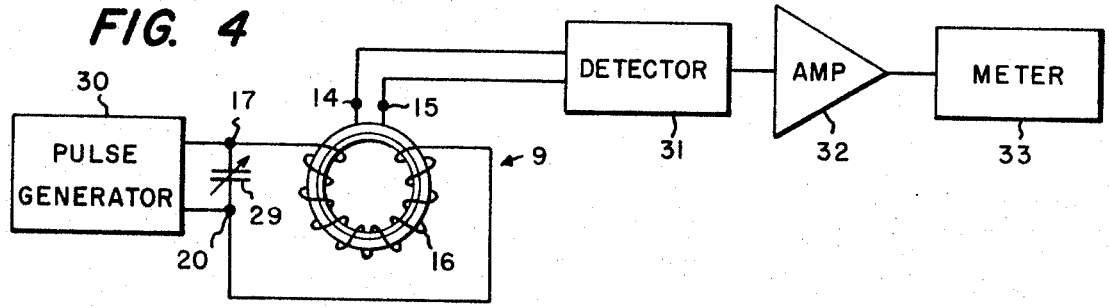
FIGS. 4, 5 and 6 are block diagrams of several magnetometer systems in which the novel sensors may be utilized.

Considering the system of the ring shaped sensor as shown in FIG. 4, a pulse generator 30 is connected to energize the drive coil at terminals 20 and 17. This sensor may be operated in the pulsed mode to minimize the power requirement of the system. Generator 30 which may be a unijunction type relaxation oscillator, for example, emits a pulsed current of several microseconds duration at a repetition rate of 6–7 kHz. The pulse sets up a lightly damped oscillation or ringing at about 1 megahertz in the resonant circuit comprising the drive coil and the variable capacitor 29. The resonant frequency of the driver section is the same as that of the pickup coil to which it is tuned. The oscillation appears on output terminals 14 and 15 of the sense coil as a carrier frequency output voltage. A signal modulation rides on the carrier. The amplitude of the modulations is independent of the repetition rate of the pulses. The modulation represents the response of the sensor to the application of an magnetic signal field. The sense coil output at terminals 14 and 15 is connected to a conventional detector 31 which removes the carrier and passes the modulation on to an amplifier 32 the output of which is connected to a suitable meter 31 or recording instrument. It is also feasible to interchange the terminals 20 and 17 with the terminals 14 and 15 so that the pulse generator directly energizes the plated wire coil and the output is taken from the winding 16.

Figure 5:
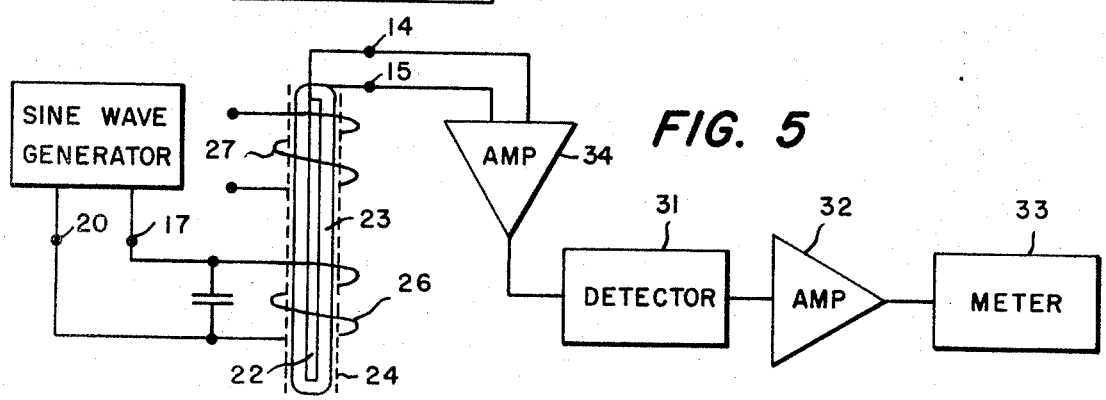

Considering the system of the flattened sensor as shown in FIG. 5, and other geometrical differences, the flattened configuration differs from the ring shaped sensor in the electrostatic shielding which separates the drive coil from the sense coil. This design also accommodates the use of a sine wave generator for energizing the drive coil. While the ring shaped sensor has been described with a pulse drive and the flattened sensor with a sine wave drive, this is for illustrative purposes and the drives may be interchanged if desired.

Figure 6:
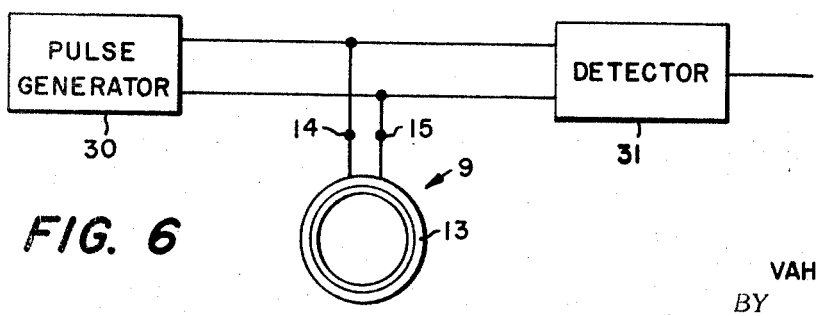

The system of FIG. 5 shows a preamplifier 34 connected between the sensor and the detector 32 bring the carrier to the necessary level. FIG. 6 shows a modification of the system of FIG. 4 in which the pulse generator 30 is connected directly to the plated wire terminals 14 and 15 and the output to the detector 31 is taken from the same terminals.

I claim:

1. A plated wire type of magnetometer wherein the sensing element is of plate wire employing a metallic core plated with a thin film of ferromagnetic material, the magnetometer comprising:

sensing element means comprising a first coil of plated wire having a plurality of turns of said plated wire, said coil terminating at a first pair of terminals;

means including a source of high frequency carrier energy connected to said sensing element means;

said sensing element means providing an output signal which is a function of the ambient magnetic field intensity; and means including detector means connected to said sensing element means to receive said output signal and provide an indication thereof.

2. The magnetometer in accordance with claim 1 said sensing element means comprising:

second coil means wound around said plated wire coil, said second coil means having a second pair of terminals;

said source of high frequency energy being connected to one pair of said first and second pairs of terminals and said means including detector means being connected to the other pair of said first and second pairs of terminals.

3. The magnetometer of claim 2 wherein said sensing element means comprises said first coil of plated wire wound on a thin rectangular form and wherein said second coil means terminals are connected to said source of high frequency energy which comprises a sine wave source of energy.

4. The magnetometer of claim 2 wherein said sensing element means comprises said first coil of plated wire wound on a cylindrical form and wherein said second coil means is wound toroidally around said first coil.

5. The magnetometer of claim 4 wherein said source of high frequency carrier energy comprises a periodic pulse source which initiates damped high frequency oscillations in said second coil means.

6. The magnetometer in accordance with claim 1 wherein said first coil, said means including a source of high frequency energy and said means including detector means are interconnected at said first pair of terminals.

* * * * *